May 5, 1925.  1,536,499

G. HORVATH

OIL COOLING AND HEATING SYSTEM

Filed Aug. 9, 1923

Inventor

Geza Horvath,

By

Attorneys

Patented May 5, 1925.

1,536,499

UNITED STATES PATENT OFFICE.

GEZA HORVATH, OF DETROIT, MICHIGAN.

OIL COOLING AND HEATING SYSTEM.

Application filed August 9, 1923. Serial No. 656,505.

*To all whom it may concern:*

Be it known that I, GEZA HORVATH, a citizen of the United States of America, residing at Detroit, in the county of Wayne and State of Michigan, have invented certain new and useful Improvements in Oil Cooling and Heating Systems, of which the following is a specification, reference being had therein to the accompanying drawings.

This invention relates to an oil cooling and heating system especially designed to insure proper lubrication in connection with the pistons, bearings and other parts of an internal combustion engine, particularly when used as the power plant of an automobile or other motor driven vehicle.

It is a well known fact that extreme temperature conditions interfere with the perfect lubrication of an internal combustion engine. In the summer time the oil used for lubrication loses part of its viscosity and is thinned out to such an extent that it becomes a poor lubricant. In the winter time a low temperature increases the viscosity of the oil to such an extent that it is some time before the oil is heated after starting an engine and during such interim the movable parts of the engine are practically devoid of lubricant. Then again, under all operating conditions the air within the crank case, cylinder block and cylinders below the pistons becomes heated during the operation of the engine, decreases the efficiency of the oil for lubricating purposes and in many instances causes burning and deterioration of the oil.

The above are, broadly stated, a few conditions encountered in the lubrication of an internal combustion engine, which my invention aims to eliminate or at least rectify to such an extent as to increase the efficiency of an engine. My invention in its broadest aspect involves utilizing air as a cooling agent for the lubricating oil and then using the air, which has absorbed heat from the oil, as a supply to the carburetor of the engine and in this manner place the engine fuel, when atomized, in a better condition for combustion purposes. This is the summer adaptation of my invention to an internal combustion engine, and in the winter the engine exhaust or a portion thereof is utilized as a heating medium for the lubricating oil.

To put my invention into practice, I employ a radiator through which air or exhaust gases may circulate and either cool or heat the walls of the radiator. The radiator is placed in the crank case of the engine where it will be partially immersed in the oil used for lubricating the engine and consequently the oil will be cooled for conduction. In leaving a portion of the rediator exposed within the crank case, the air in the crank case cylinder block and cylinders below the pistons is circulated, during the operation of an internal combustion engine and impinges the exposed portion of the radiator to be cooled thereby. In the winter time, the reverse takes place, the walls of the radiator being heated by exhaust gases and the oil and air heated by conduction. In order that the radiator may be used for cooling and heating purposes a system of control is provided, and as showing one embodiment of my invention, reference will now be had to the drawing, wherein—

Figure 1:
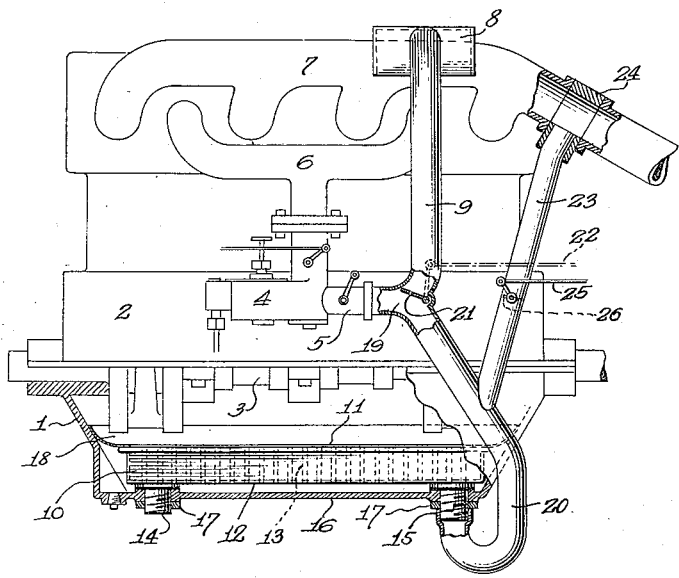
Figure 1 is a side elevation of an internal combustion engine having an oil cooling and heating system embodying features of my invention.
Figure 2:
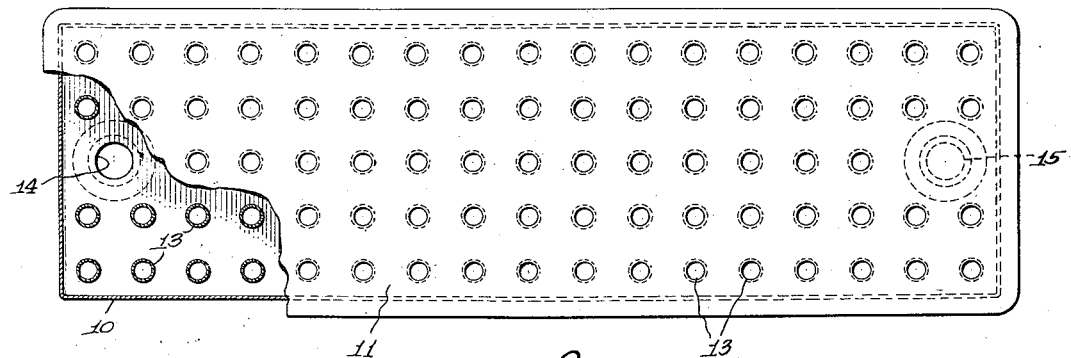
Fig. 2 is an enlarged plan of a radiator, partly broken away and partly in section.
Figure 3:
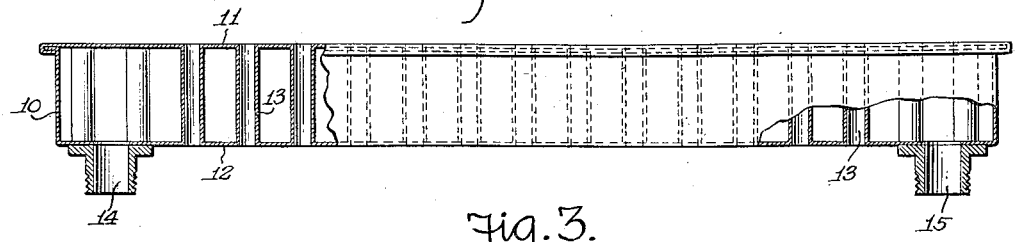
Fig. 3 is a side elevation of the same, partly broken away and partly in section.

In the drawing, I have illustrated a conventional form of internal combustion engine as including a crank case 1, a cylinder block 2, a crank shaft 3, a carburetor 4 having an air intake connection 5, an intake manifold 6 establishing communication between the carburetor 4 and the cylinders of the engine, and an exhaust manifold 7 for the exhaust gases of the engine. In some instances the exhaust manifold 7 is provided with a stove 8 by which air is heated and supplied to the air intake connection 5 by a conduit 9, such equipment being especially adapted for winter time operation of the engine.

An engine such as I have outlined above ordinarily has a lubricating system by which oil is placed in the crank case 1 or accumulating therein may be strained and distributed to the bearings and other movable parts of the internal combustion engine, the oil being circulated and replenished from time to time. The crank case ordinarily contains the oil circulating pump and said crank case serves as a reservoir. It is in the crank case or one especially designed for my purpose that I place a radiator, entirely enclosed, in contradistinction to radiators or cooling or heating devices wholly exterior of the crank case. The radiator comprises an oblong comparatively flat casing 10 having a top wall 11 and a bottom wall 12, said walls being connected by a multiplicity of tubes 13 suitably distributed throughout the casing with the ends of the tubes opening at the walls 11 and 12 of the casing.

The bottom wall 12 of the casing, contiguous to its ends, has connections 14 and 15 that may extend through the bottom wall 16 of the crank case 1 and be attached thereto by nuts 17 of such fastening means as will establish a non-leakable connection between the crank case and the radiator casing. The radiator casing may occupy the greater part of the crank case, leaving room for the oil circulating pump, a gauge, and any other elements or devices ordinarily found in a crank case, and on the top wall 11 of the radiator is placed an oil deflecting frame or marginal flange 18 which will cause the oil to flow on to the upper wall 11 of the casing and then through the tubes 13 into the bottom part of the crank case, instead of accumulating within the crank case without passing through the tubes 13.

The air intake connection 5 of the carbureter 4 has a Y connection 19 by which the conduit 9 communicates with the intake connection 5 and the Y connection 19 permits of another conduit 20 extending therefrom to the connection 15 of the radiator casing 10. In the Y connection 19 is located a flap valve 21 that may be adjusted by a suitable operating mechanism 22 to close either the conduit 9 or the conduit 20 relative to the air intake connection 5.

The conduit 20 may be provided with a branch 23 communicating with a connection 24 of the exhaust pipe 7 and the branch 23 is provided with a conventional form of butterfly valve 26 that may be adjusted by an operating mechanism 25.

Considering summer use of my invention, the valve 21 is adjusted to close the conduit 9 and establish communication between the air intake connection 5 of the carbureter 4 and the conduit 20 leading to the radiator casing 10. Air is admitted at the connection 14 of the radiator casing 10 and this connection may be provided with a conventional form of breather or air screening device which will more or less remove solid particles from the air drawn into the radiator and through the conduit 20 into the carbureter because of the reduction of atmospheric pressure produced in the carbureter and the manifold 6 by the reciprocable pistons of the engine. Air on entering one end of the radiator casing is drawn throughout the length thereof to the connection 15 and consequently impinges against the tubes 13 and the walls of the radiator casing to cool the same and any oil that may be within the tubes 13 and exteriorly of the radiator casing. The air in passing through the radiator absorbs heat from the oil and this heated air on commingling with atomized fuel places such fuel in better condition for combustion purposes within the cylinders of the engine.

Besides the air reducing the temperature of the oil within the crank case 1 the air reduces the temperature of the top wall 11 of the radiator casing, this wall being preferably above the level of oil contained in the crank case. In view of this arrangement the air within the crank case, cylinder block and cylinders below the pistons will impinge against the wall 11 and be cooled thereby, such cooling of air tending to reduce temperatures within the engine so that the parts are maintained in better working order and particularly such lubricating oils as have been distributed about the engine.

In the winter, the valve 21 may be adjusted to shut off the conduit 20 and open the conduit 9 so that the carbureter may receive heated air from the stove 8. In order to prevent congealing of the lubricating oil in the crank case 1, because of a low outside temperature, the valve 26 may be opened to permit a portion of the exhaust gases from the engine passing through the conduit 20 into the connection 15, radiator casing 10, and exhausting at the connection 14. The hot gases will heat the tubes and walls of the radiator and cause the oil within the crank case to be heated by conduction and placed in a better condition for lubricating purposes. It is obvious that the wall 11 will be heated and consequently the air within the engine, therefore, such lubricating oil distributed about the engine will be immediately placed in a lubricating condition. This is particularly true when first starting an engine in cold weather and it is only a matter of a few seconds until the lubricating system is functioning just as well in the cold weather as in the summer.

I attach considerable importance to the fact that the radiator is within the crank case and that the conduits may be easily and quickly installed without any material or important changes in connection with the engine, what changes there may be are outside of the engine. It is obvious that the radiator casing may be shaped other than shown so as to fit in various types of crank cases, but if such an installation is impossible the crank case can be easily changed so as to readily accommodate the radiator. This is particularly true where there may be a splash system of lubrication.

My invention is primarily designed as an oil cooling device and is not necessarily limited to the combined use of oil heating means with oil cooling means, for in some climates the conduits 9 and 23 may be eliminated and simply the conduit 20 employed for supplying warm air to the carbureter besides establishing the air intake for the oil cooling radiator.

My invention is also primarily designed for the internal combustion engine of an automobile having a dash from which the throttle operating mechanism or rods 22 and 25 may be controlled, but it is in this connection that the invention is applicable to any engine having a fuel supply system that may not include a carbureter. Then again, instead of having the throttles controlled from the dash, provision may be made for a thermostatic control of the throttles, particularly the throttle 21.

While in the drawing there is illustrated a preferred embodiment of my invention, it is to be understood that the structural elements are susceptible to such variations and modifications as fall within the scope of the appended claims.

What I claim is:—

1. An oil cooling device for an internal combustion engine having a crank case, and a carbureter adapted to receive air, said device comprising an oil cooling radiator in the crank case and receiving air from outside of said crank case and discharging air into said carbureter, said oil cooling radiator having an upper wall above the level of oil in said crank case and adapted to cool air in said engine.

2. In an internal combustion engine having a crank case, a carbureter, provided with an air intake connection, an exhaust manifold provided with a stove, and a conduit connecting said stove to the air intake connection of said carbureter to supply heated air to said carbureter:—an additional source of heated air for said carbureter comprising a radiator communicating with the atmosphere and located in said engine so that air admitted to said radiator will be heated by said engine, and a conduit connecting said radiator to the first mentioned conduit.

3. An internal combustion engine as called for in claim 2, and a valve at the juncture of said conduits for the selective use of either source of heated air.

4. An internal combustion engine as called for in claim 2 wherein the radiator is located in the crank case of the engine to be heated by lubricating oil contacting with the radiator.

5. In an internal combustion engine having a crank case, a carbureter provided with an air intake connection, an exhaust manifold provided with a stove, and a conduit connecting said stove to the air intake connection of said carbureter to permit the engine to draw heated air into said carbureter from said stove:—another source of heated air for the carbureter comprising means in the engine communicating with said carbureter and with the atmosphere and adapted to absorb heat from lubricating oils of the engine to heat air drawn through said means into the carbureter.

6. An internal combustion engine as called for in claim 5 wherein said means includes a radiator located in the bottom of the crank case of the engine.

7. In an internal combustion engine, the combination with a crank case, a carbureter having an air intake connection, and an exhaust pipe, of an oil cooling radiator in the crank case of said engine communicating with the atmosphere and the air intake connection of the carbureter so that the engine may draw air through the radiator into the carbureter with the air absorbing heat from oil in the crank case, and a connection between said exhaust pipe and said radiator by which exhaust gases may be used to heat said radiator and oil contacting with said radiator.

8. In an internal combustion engine, the combination with a crank case, a carbureter having an air intake connection, an exhaust pipe having a stove, and a conduit connecting said stove to the intake connection of said carbureter to permit the engine to draw heated air into said carbureter from said stove, of a radiator in the engine crank case communicating with the atmosphere and the carbureter to permit the engine to draw air through the radiator into the carbureter, said radiator being exposed to oil and air in the engine to absorb heat therefrom in the summer, means in connection with said conduits to permit of either source of heated air being used, and another valved conduit connecting said exhaust pipe to the last mentioned conduit to permit of exhaust gases being used to heat said radiator and oil and air contacting therewith.

9. In an explosive engine, means adapted for cooling lubricating oils in the summer and heating lubricating oils in the winter, said means including a radiator mounted in the engine and through which air may be circulated to cool the oils contacting with the radiator, selective means by which piston suction of the engine may draw air through the radiator, and selective means adapted to conduct exhaust gases to said radiator for heating said radiator and oils contacting therewith.

In testimony whereof I affix my signature in the presence of two witnesses.

GEZA HORVATH.

Witnesses:
KARL H. BUTLER,
ANNA M. DORR.